UNITED STATES PATENT OFFICE.

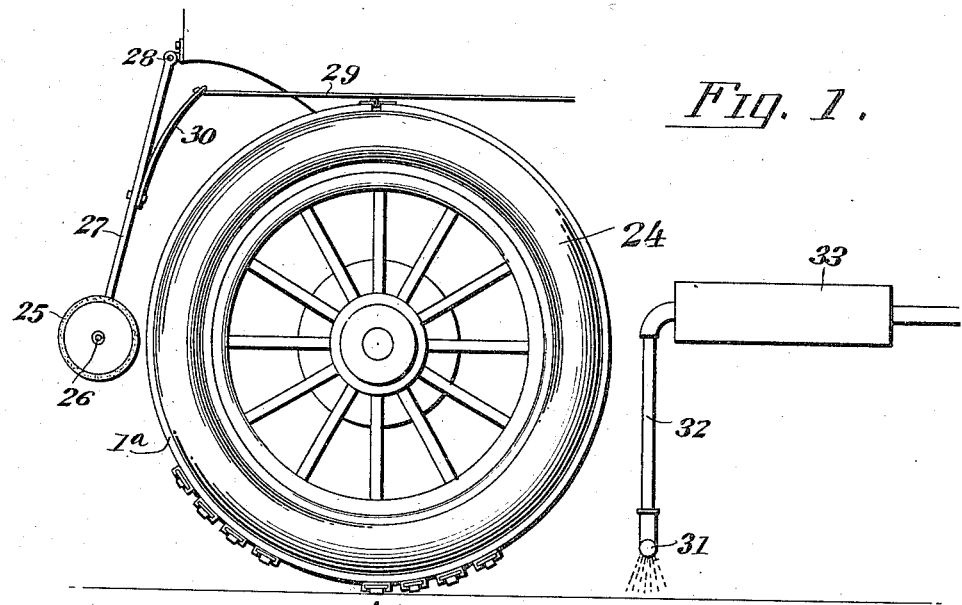
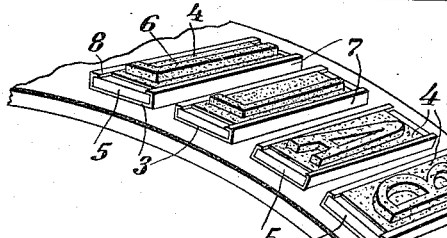
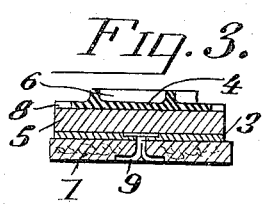
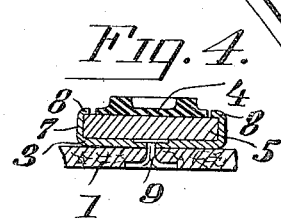
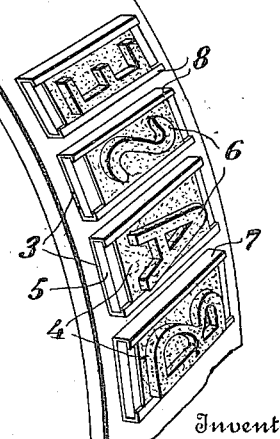

WILLIAM J. RYAN, OF SAPULPA, OKLAHOMA.

SIGN-PRINTER.

1,092,749.   Specification of Letters Patent.   Patented Apr. 7, 1914.

Application filed August 5, 1913. Serial No. 763,123.

*To all whom it may concern:*

Be it known that I, WILLIAM J. RYAN, a citizen of the United States, residing at Sapulpa, in the county of Creek and State of Oklahoma, have invented new and useful Improvements in Sign-Printers, of which the following is a specification.

This invention is an improved stamping device for street advertisements designed constructed and arranged to stamp any desired character, letter, sign or series of words or ornamental design on a street pavement, rapidly and at successive intervals for advertising or other suitable purposes the invention consisting in the construction, combination and arrangement of devices hereinafter described and claimed.

One object of my invention is to provide an improved sign painting or advertising device of this character which may be used on a roller or on the tire of an automobile wheel and caused to print on a pavement at each rotation of said roller or wheel.

Another object is to provide improved means for supplying a stamp or printing device with ink or color.

Another object is to effect improvements in the construction of the printing belt or tire whereby the same may be provided with suitable interchangeable printing types or characters.

Another object is to combine with the printing belt or tire and its inking device, a blower for cleaning the surface of the pavement immediately in advance of the wheel carrying the printing belt or tire.

In the accompanying drawings: Figure 1 is an elevation of my invention in which the printing belt or tire is shown arranged on and around the tire of an automobile wheel for operation thereby and in connection with an inking device and a blower. Fig. 2 is a detail perspective view of the printing belt or tire showing the same detached from the roller or wheel. Fig. 3 is a detail transverse sectional view of the same. Fig. 4 is a detail longitudinal sectional view of the same.

In accordance with my invention I provide a printing belt or tire 1 of suitable length and breadth, which, is flexible and may be made of leather or other suitable material and is adapted to be placed around and secured on the periphery of a roller or the tire of an automobile wheel for rotation therewith and operation thereby. This printing tire or belt is provided at its ends with suitable fastening devices 2. Within the scope of my invention any suitable means may be employed for securing the printing belt in place. On the peripheral or on the outer side of the printing belt, at suitable distances apart, are holders 3 for printing types or characters 4 each of which comprises a body 5 and a raised printing surface or face 6. In practice a body of each type may be made of wood or other suitable material and the printing type or character should be made of rubber or other elastic material. The width of the body exceeds that of the printing face so that the body projects from opposite sides of the printing face and each holder 3 is provided with side walls 7 having inturned flanges 8, the bodies of the types being adapted to be placed between the side walls of the holders and the flanges of said holders being adapted to bear on the outer sides of said bodies of the type on opposite sides of the printing portions 6 thereof. Hence the printing types may be placed in or taken out of the walls and arranged in any desired order to spell the required words and cause the same to be printed, and this construction and arrangement of devices enables signs, announcements or the like to be readily composed and set up on the printing belt. The holders are attached to the printing belt by means of suitable rivets or other suitable devices 9 having split shanks which are clenched in opposite directions on the inner side of the printing belt or tire, the said rivets or other fastening device being arranged at the centers of the holders as shown. The slightly spaced relation of the holders enables the printing belt or tire to flex when in operation without bending or imposing undue stress and weight on the holders and the types therein.

The printing belt 1ª is arranged on the tread of the tire of an automobile wheel 24. The body of the automobile being mounted on the usual springs is thereby connected to the wheel 24 for yielding movement. The revoluble inking pad 25 is arranged in rear of said wheel and is mounted on an arm 26 of a lever 27 which is mounted for vertical angular movement and is connected to the automobile body as at 28 and to the upper end of which a shifting rod or opposite rod 29 is connected. The connection between the shifting rod and the lever 27 includes a spring 30 which when the shifting rod is in the required position to turn the lever 27 so as to cause the inking pad to bear on the printing face of the printing belt, serves to cushion the said printing pad and adapted for slight spring movement toward and from the printing surface of the printing belt and thus reduce friction between the printing pad and the printing face of the belt and yet cause the pad to thoroughly ink the faces of the raised types or characters of the printing belt as will be understood.

In order to clear the dirt and dust from the surface of the pavement in front of the wheel 24 I provide a blower which is here shown as a nozzle 31 connected to a pipe 32 which leads from the muffler 33 of the automobile.

Modifications may be made within the scope of my invention as defined by the appended claim.

Having thus described my invention, I claim:

The herein described pavement printing device comprising a supporting wheel, a body supported by the wheel and connected thereto for yielding movement, a lever pivotally connected to the body and extending downwardly therefrom, a revoluble ink pad carried by the said lever, a spring arm attached to said lever, a shifting rod connected to the said spring arm, and a printing belt arranged around the periphery of said wheel, the ink pad being movable by said lever to and from said printing belt and the spring arm of said lever compensating for the yielding movement of the said body.

In testimony whereof I affix my signature in presence of two witnesses.

WILLIAM J. RYAN.

Witnesses:
S. J. SMITH,
F. J. DUNN.

---

Copies of this patent may be obtained for five cents each, by addressing the "Commissioner of Patents, Washington, D. C."